No. 767,258. PATENTED AUG. 9, 1904.
J. E. BERRY.
BRAKE.
APPLICATION FILED OCT. 29, 1903.
NO MODEL. 2 SHEETS—SHEET 1.
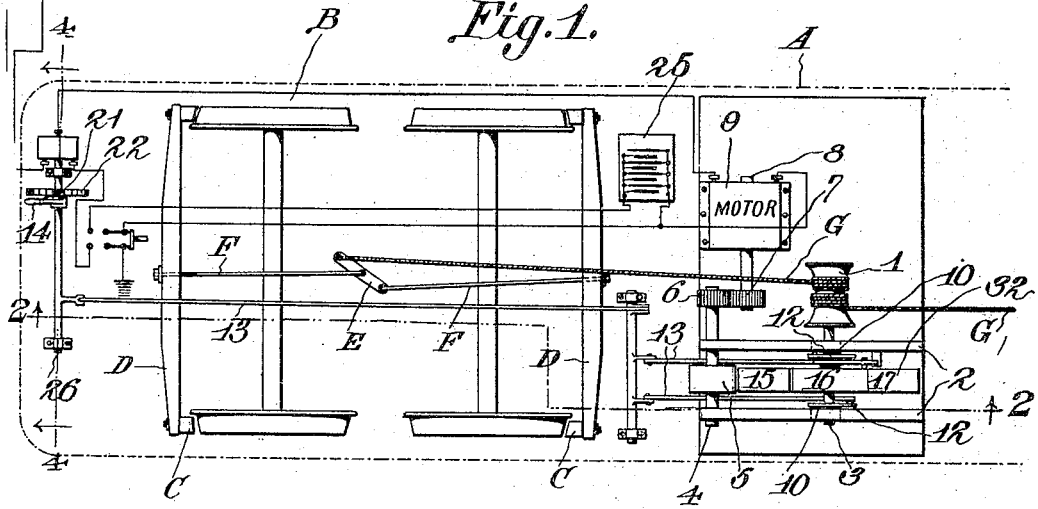
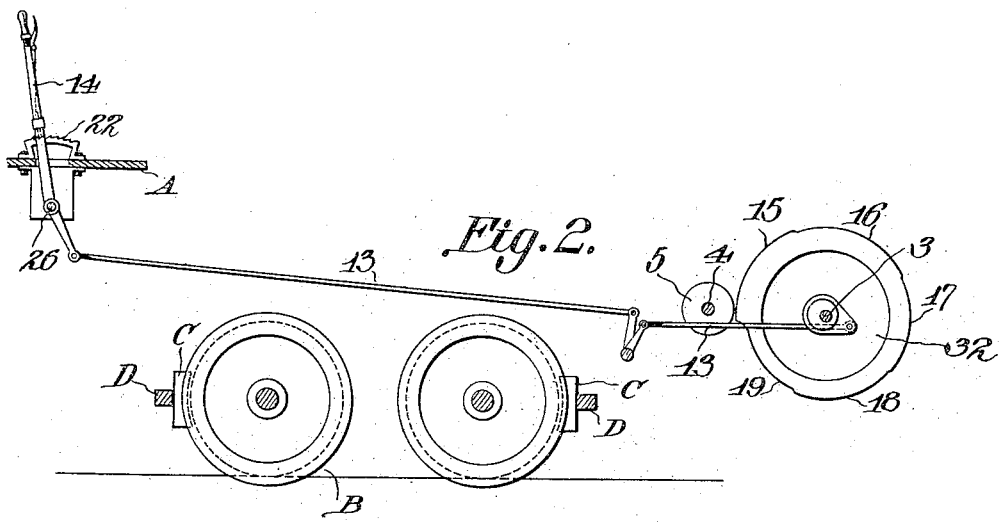
Joseph E. Berry, Inventor.
Witnesses

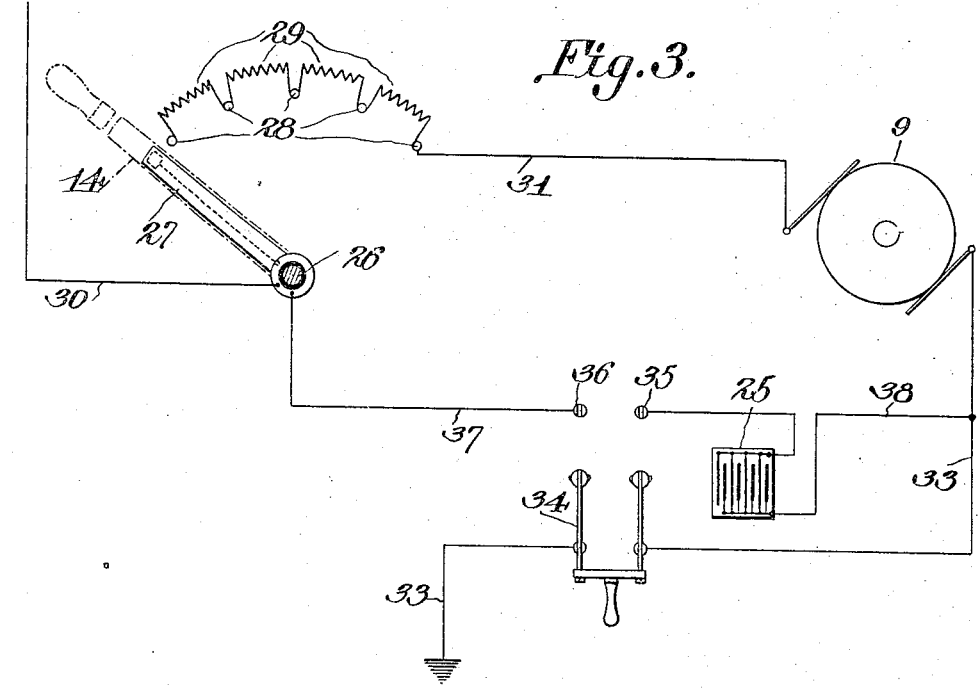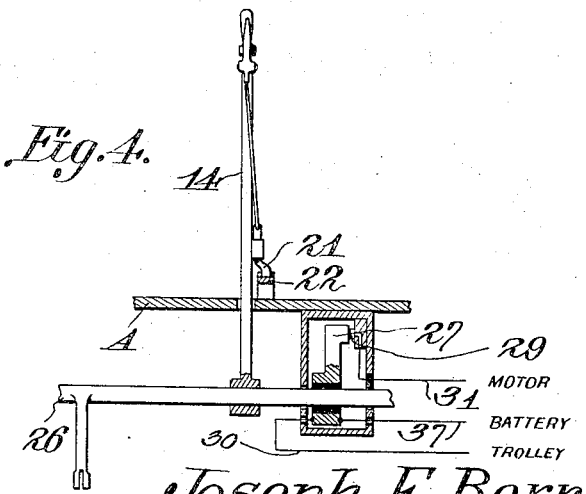

No. 767,258. Patented August 9, 1904.

UNITED STATES PATENT OFFICE.

JOSEPH EVERT BERRY, OF CARTERVILLE, MISSOURI.

BRAKE.

SPECIFICATION forming part of Letters Patent No. 767,258, dated August 9, 1904.

Application filed October 29, 1903. Serial No. 179,047. (No model.)

*To all whom it may concern:*

Be it known that I, JOSEPH EVERT BERRY, a citizen of the United States, residing at Carterville, in the county of Jasper and State of Missouri, have invented a new and useful Brake, of which the following is a specification.

This invention relates to certain improvements in brakes, and has for its principal object to provide a brake that in part is actuated by electrical energy and in part manually, the adjustment of a single lever under the control of the operator serving to apply the brakes with greater or less force and the movement of such lever simultaneously closing the electric circuit.

A further object of the invention is to provide a device of this character in which the electromotive force will be in proportion to the distance to which the adjusting-lever is moved, so that the power used to apply the brakes will be regulated in accordance with the extent of such movement.

A still further object of the invention is to provide a brake adapted more especially for electric cars and wherein provision is made for the switching in of a storage battery or of similar source of electrical energy should the car be cut off from the trolley-wire or other main conductor.

With these and other objects in view the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a plan view of sufficient of a car to illustrate the application thereto of a braking system in accordance with the present invention. Fig. 2 is a longitudinal sectional elevation of the same on the line 2 2 of Fig. 1. Fig. 3 is a diagram of the circuits. Fig. 4 is a detail sectional view on the line 4 4 of Fig. 1, showing the mounting of the operating-lever.

Similar characters of reference are employed to indicate corresponding parts throughout the several figures of the drawings.

In carrying out the present invention I provide a brake so arranged and constructed that the braking force applied will be wholly under the control of the motorman or other operative on the car and in which electromotive force will be adjusted in proportion to the degree of force to be used in setting the brake.

In the drawings, A indicates the outline of an ordinary form of car, of which there is shown a forward truck B, having brake-shoes C and brake-beams D. The brake-beams are connected by the usual truck-levers E and connecting-rods F to chains G, that extend to a winding-drum 1, the turning of which will wind up the chains in proper direction to apply the brakes, and the extent of rotative movement of such drum will determine the degree of force used in setting the brakes.

At a point near the center of the car is arranged a pair of brackets 2 and forming bearings for the support of a pair of horizontally-disposed and transversely-extending shafts 3 and 4. The shaft 4 carries a small friction driving-roller 5 and further carries a gear 6, intermeshing with a pinion 7 on an armature-shaft 8 of an electric motor 9. The motor may be of any ordinary construction and is wired in such manner that the operating-current on the car or a current from the storage battery on the car may be utilized.

The bearings for the shaft 3 are formed by a pair of eccentrics 10, that are mounted in the openings formed in the brackets 2, and each of the eccentrics is provided with a crank-arm 12, that is connected by a system of levers 13 to an operating-lever 14, arranged at the front of the car in a position convenient to the motorman. When the main lever 14 is operated, the eccentrics are turned in one direction or the other and the distance between the shafts 3 and 4 is altered to a corresponding extent. On the shaft 3, which carries the chain-winding drum 1, is secured a brake-operating disk 32, which is moved by the eccentrics toward and from the small friction-roller 5. The friction-disk has a stepped periphery divided into a plurality of friction-faces arranged at gradually-increasing distances from the center of rotation of the disk, these faces being indicated at 15, 16, 17, 18, and 19, the length of the several faces or steps being approximately the same and the divisional-line between successive steps being represented by slightly-rounded shoulders, as illustrated in Fig. 2. Each of the friction faces or steps is disposed in a line concentric with the axis of rotation of the disks, and the several friction-faces, starting with the face 15, may be successively moved into engagement with the friction driving-roller 5 by proper adjustment of the eccentrics 10, and thus permitting the setting of the brakes with any desired degree of force. Under normal conditions when the brake is not set the friction-face 15 being farthest from the shaft 3 is facing the friction driving-disk 5, but is out of contact therewith.

When the operator wishes to apply the brakes, the lever 14 is moved until its locking-latch 21 engages the first notch of locking-segment 22. This turns the eccentrics 10 to an extent sufficient to bring the face 15 into contact with the driving-roller 5, and disk 34 is turned until the driving-roller 5 arrives at the shoulder between the steps or friction-faces 15 and 16. The disk 32 will be held at this point by the revolving disk 5; but there can be no further rotative movement of disk 32 unless the motorman again moves his operating-lever another notch and brings the friction-face 16 into contact with the driving-roller 5. This results in further rotative movement of disk 32, and the winding-drum is moved to an extent sufficient to apply the brakes with greater force. By moving the operating-lever a notch at a time all of the steps or faces may be brought successively into engagement with the roller and the brakes applied with sufficient force to arrest the movement of the car.

The disk 5 is actuated by the electric motor 9, previously referred to, and the current for operating the motor may be taken from the operating-current of the car or from a storage battery 25, carried by such car.

The main operating-lever 14 is rigidly secured to a rock-shaft 26, mounted in suitable brackets at the front platform of the car, and to this shaft is secured an insulated arm 27, forming a switch adapted to move into engagement with a series of contacts 28, between which are resistance-coils 29, the whole constituting a rheostat through which the current flows from the source of energy to the motor, and at the first movement of the lever the arm 27 will complete a circuit through all of the coils of the rheostat, so that a current of comparatively low strength will flow to the motor. When the lever is moved to the next notch of the segment, the circuit-closing arm 27 will be moved to cut out one or more of the coils and the current of greater energy will flow to the motor, this being necessary owing to the increased resistance of the brakes. As the brakes are set harder and harder by movements of the lever 14, the strength of the current will be gradually increased by cutting out more and more of the resistance-coils in order that the strength of the current may be proportioned to increase in resistance of the brakes. In the present case the wiring may be traced from a main conductor 30, leading from the trolley-line third rail or other conductor and passing to lever 27, thence through the rheostat to wire 31, motor 9, a wire 33 to ground, the circuit being established by means of a suitable switch 34 within convenient reach of the motorman. Should the trolley leave the current-conducting wire or the current fail from any cause, the switch 34 may be thrown to the opposite position in engagement with contacts 35 and 36. This will establish a circuit from battery 25, contact 35, switch 34, contact 36, wire 37, lever 27, the rheostat, wire 31, motor 9, and wire 38 to battery, the switch cutting out the ground-wire 33. It will thus be seen that the adjustment of the position of the brake-applying disk will result in a corresponding adjustment of the position of the main switch, so that the energy of the current may be proportioned to the work. In some cases the switch 34 may be mechanically connected to the trolley-rope, so that if the latter moves upward, in the event of the trolley leaving the wire, the switch will be automatically thrown to close the storage-battery circuit and place the system in working condition in readiness for the motorman.

Having thus described the invention, what is claimed is—

1. The combination with a brake, of a revoluble brake-operating member, means for turning the same, means for adjusting the position of the operating member and its turning means, and means movable with the adjusting means for regulating the degree of force imparted to the turning means in proportion to the extent of movement of the adjusting means.

2. In an electrical brake-operating mechanism, a brake, a revoluble operating mechanism therefor, a revoluble disk for transmitting movement to said operating mechanism, a motor operatively connected to the disk, and a single operating device for adjusting the position of the disk and revoluble member and for simultaneously closing the motor-circuit.

3. In an electrical brake-operating mechanism, a brake, actuating means including an electric motor normally disconnected from the brakes, a circuit in which the motor is included, a circuit-closer, means for adjusting portions of the brake-operating mechanism to connect the motor to the brakes, and a single actuating device for operating both the adjusting means and the circuit-closer.

4. In an electric brake-operating mechanism, a revoluble disk having a stepped periphery, a friction driving-roller for engaging therewith, an operating-lever for adjusting the relative positions of the disk and roller, a motor for revolving the disk, a circuit in which the motor is connected, and a circuit-closer connected to and movable with said lever.

5. In an electric brake-operating mechanism, a revoluble disk having a stepped periphery, means for transmitting rotative movement thereof to the brakes, a friction driving-roller for engaging the periphery of the disk, an operating-lever for adjusting the relative positions of the disk and roller, a motor for revolving the roller, a circuit in which the motor is connected, a circuit-closer including a rheostat, and means for connecting said circuit-closer to the operating-lever thereby to close the circuit and govern the strength of the motor-current in proportion to the extent of movement of such adjusting-lever.

6. In an electric brake-operating mechanism, a pair of pendent brakes having bearing-openings, a pair of eccentrics mounted in said openings, a shaft having bearings in the eccentrics, a disk secured to the shaft and having a stepped periphery, crank-arms connected to the eccentric, a pivoted lever operatively connected to the crank-arms, a rock-shaft carrying said lever, an electric motor, a friction-roller secured to the armature-shaft of the motor and adapted to engage the stepped disk, an electric circuit, a rheostat connected in the circuit, and a circuit-closing arm carried by the rock-shaft and movable over the rheostat-contacts thereby to proportion the strength of the motor-circuit in accordance with the extent of movement of the pivoted lever.

7. In an electric-operated brake, an electric motor, a brake-actuating means driven by the motor, an operating-lever for adjusting the position of the brake-actuating means, a circuit-closer movable with said lever, a circuit including a source of electrical energy distinct from the vehicle to which the brake is attached, a local source of electrical energy carried by the vehicle, and independent circuits including a switch movable to connect either one of the sources of electrical energy to the motor.

In testimony that I claim the foregoing as my own I have hereto affixed my signature in the presence of two witnesses.

JOSEPH EVERT BERRY.

Witnesses:
    J. B. McDEARMON,
    W. B. LESLIE.